Patented Aug. 11, 1931

1,817,993

UNITED STATES PATENT OFFICE

FRANK E. LICHTENTHAELER, OF NEWTON HIGHLANDS, MASSACHUSETTS

METHOD OF CONCENTRATING AQUEOUS SOLUTIONS OF VOLATILE SUBSTANCES

No Drawing.    Application filed May 19, 1925.    Serial No. 31,342.

The present invention relates to methods of concentrating aqueous solutions of volatile substances and more particularly to the general method disclosed in the Lichtenthaeler Patents Nos. 1,492,717 and 1,492,718, granted May 6, 1924. These patents describe the method of concentrating a solution by absorption of the water as water of crystallization in a hydrate forming salt which is added to the solution; and thereafter separating the concentrated substance from the salt by means of a solvent which does not dissolve the salt. This method is in any event more economical than the fractional distillation method and is especially useful when the latter is not commercially feasible, as when the boiling point of the substance to be concentrated is very close to that of water.

The object of the present invention is to provide improvements in the method of the above mentioned patents by which good yields of the concentrated volatile substance of high purity may be obtained.

According to the present invention the excess water in the solution which it is desired to concentrate is taken up by the addition of an anhydrous hydrate forming salt, as disclosed in the patents above referred to, but instead of subjecting the resultant mass to the action of a solvent, the difference in vapor tension of the volatile substance and the salt is availed of to effect separation of these constituents. The separation, therefore, proceeds by vaporization or volatilization rather than by solution, so that because of the elimination of soluble impurities the resultant product may be made of high concentration and high purity. The principal condition to be fulfilled is that at no time shall the temperature conditions be such as to cause dehydration or decomposition of the hydrated salt. In particular the invention contemplates removal of the volatile substance from the mixture by treatment with a current of air or other inert gas, with or without the application of heat, so as to carry away from the surface of the mass the molecules of the volatile substance which are dispersed by evaporation into the surrounding atmosphere. The invention also contemplates, either as an alternative method or concurrently with the above, the application of heat to the hydrate-acid mixture which is maintained under a sufficient vacuum to permit vaporization of the volatile substance at a temperature which does not induce decomposition of the hydrate.

The preferred mode of practicing the present invention will be described as employed in connection with the manufacture of concentrated acetic acid.

The acetic acid is produced in the form of vinegar by the quick vinegar process from molasses or as pyroligneous liquor of wood distillation and exists in approximately a 10% solution. After preliminary cleaning, by filtration or otherwise, there is added to the dilute acid an anhydrous hydrate forming salt in sufficient amounts to absorb from the solution the desired amount of water. If anhydrous ammonium alum is used, approximately 125 pounds would be required for each 100 pounds of the dilute acetic acid, while with sodium sulphate anhydride or salt cake about 100 pounds would be required for each 100 pounds of dilute acid. The anhydrous salt is preferably in pulverized condition and is added slowly to the solution as described in the Lichtenthaeler patents. When the reaction is complete and the mass is hardened, it is pulverized and the acetic acid exists in a highly concentrated condition as a film over the crystals of the hydrated salt.

The acid is now removed from the mass by volatilization or vaporization thereof, and this is conveniently effected by passing air or other gas over or through the mass. The temperature at which this vaporization takes place must be less than that at which decomposition of the hydrated salt sets in, and moreover the air or gas must be dry so as not to introduce into the volatile acid any amounts of water which have already been removed by the preceding operation. Moreover, the gas must be of a nature such as not to react chemically with either the substance to be concentrated or the hydrated salt; that is to say, the gas must be inert with respect to the substances. Maximum economy of vaporization requires that either the hydrate-acid mixture or the inert gas be heated so that the vapor tension of the acid may be as high as possible, but the temperature conditions are determined from the dehydrating temperature of the salt; for example, using sodium sulphate temperatures in excess of about 33° C. cannot be used; otherwise, the salt would lose its water of crystallization and would return a large part of it to the acetic acid vapor. Ammonium, sodium or potassium alums, however, permit the use of a somewhat higher temperature. This operation of volatilizing or vaporizing by the use of a gas or air is conveniently carried out by a counter-current method similar to that described in Patent No. 1,492,717 by which the mixture in a battery of extraction cells operated in a continuous series manner is subjected to the action of the gas, the arrangement being such that the freshest gas contacts in the first cell with a mixture containing a relatively small quantity of acetic acid and, as the gas progresses through the various cells, with continuously increasing amounts of acid.

After separation of the acetic acid from the salt, it is next necessary to recover the acid from the mixture with the inert gas. This may be accomplished in several ways, preferably by cooling the mixture to liquefy the acid and pass the gas off for further use in the process. The separation may also be effected by adsorption of the acid in charcoal, silica gel or other adsorbent. The adsorbent material takes up the vapor of the acid and permits the inert gas to pass off, after which the acid may be recovered from the adsorbent material by heating.

The separation of the acid from the hydrate may be enhanced by carrying out the vaporization at the boiling point of the acetic acid, the mixture being placed under a vacuum in order that the heat applied for this purpose may not be sufficient to cause dehydration of the salt. This method may be employed without the current of gas, in which case the pressure and temperature conditions are to be so adjusted as to prevent decomposition of the salt. For example, to permit boiling of acetic acid which is mixed with sodium sulphate hydrate a vacuum at least 29 inches, and preferably 30 inches, is necessary to permit boiling of the acid without decomposition of the salt, but with ammonium alum a lower vacuum is permissible because the temperature for boiling may be raised considerably without affecting the salt. This method may also be used in combination with the gas current method by maintaining the system at sub-atmospheric pressure and circulating the gas therethrough. Inasmuch as the principal advantage of sub-atmospheric pressure conditions obtains only when the process is carried to the vaporizing point, it will be appreciated that this process is available for practical use only with such a hydrate forming salt as will permit boiling of the acid at a fairly high pressure and temperature.

The product obtained by the present invention, occurring as it does through vaporization of the volatile substance, is of high purity and concentration and requires no further purifying treatment.

What is claimed is:

1. The method of concentrating aqueous solutions of volatile substances which consists in mixing therewith a quantity of an anhydrous hydrate forming salt chemically non-reactive with the volatile substance to take up the water, allowing the salt to crystallize from the solution, separating the volatile substance from the hydrated salt by subjecting the mixture to a current of inert gas at a temperature insufficient to cause decomposition of the salt, and recovering the volatile substance from the inert gas.

2. The method of concentrating aqueous solutions of volatile substances which consists in mixing therewith a quantity of an anhydrous hydrate forming salt chemically non-reactive with the volatile substance to take up the water, allowing the salt to crystallize from the solution, separating the volatile substance from the hydrated salt by passing over the mixture a current of inert gas at sub-atmospheric pressure and at a temperature insufficient to cause decomposition of the hydrated salt, and recovering the volatile substance from the inert gas.

3. The method of concentrating an aqueous solution of acetic acid which consists in mixing therewith a quantity of an anhydrous hydrate forming salt chemically non-reactive with the acetic acid, allowing the salt to crystallize, separating the acetic acid from the salt by passing a current of inert gas over the mixture at a temperature insufficient to cause dehydration of the salt, and recovering the acetic acid from the inert gas.

In testimony whereof I have signed my name to this specification.

FRANK E. LICHTENTHAELER.